(No Model.) 6 Sheets—Sheet 1.

C. H. WILLCOX & S. BORTON.
SEWING MACHINE.

No. 472,095. Patented Apr. 5, 1892.

Fig. 1.

Witnesses
Chas. F. Schmelz.
Geo. T. Smallwood.

Inventors
Charles H. Willcox
and Stockton Borton
by Pollok & Mauro
their attorneys.

(No Model.) 6 Sheets—Sheet 3.

C. H. WILLCOX & S. BORTON.
SEWING MACHINE.

No. 472,095. Patented Apr. 5, 1892.

Witnesses
Chas. F. Schmelz.
Geo. T. Smallwood.
Rafer L. Hogue

Inventors
Charles H. Willcox
and Stockton Borton
by Pollok & Mauro
their attorneys

(No Model.) 6 Sheets—Sheet 4.

C. H. WILLCOX & S. BORTON.
SEWING MACHINE.

No. 472,095. Patented Apr. 5, 1892.

Witnesses
Chas. F. Schmelz
Geo. T. Smallwood

Inventors
Charles H. Willcox
& Stockton Borton
by Pollok & Mauro
their attorneys (No Model.) 6 Sheets—Sheet 5.

C. H. WILLCOX & S. BORTON.
SEWING MACHINE.

No. 472,095. Patented Apr. 5, 1892.

(No Model.) 6 Sheets—Sheet 6.
C. H. WILLCOX & S. BORTON.
SEWING MACHINE.

No. 472,095. Patented Apr. 5, 1892.

Witnesses:
Jonathan Alley
Will T Norton

Inventors,
Chas H. Willcox & Stockton Borton,
By Pollok & Mauro,
their Attorneys.

United States Patent Office.

CHARLES H. WILLCOX, OF NEW YORK, N. Y., AND STOCKTON BORTON, OF PROVIDENCE, RHODE ISLAND, ASSIGNORS TO THE WILLCOX & GIBBS SEWING MACHINE COMPANY, OF NEW YORK, N. Y.

SEWING-MACHINE.

SPECIFICATION forming part of Letters Patent No. 472,095, dated April 5, 1892.

Application filed May 24, 1890. Serial No. 353,091. (No model.)

*To all whom it may concern:*

Be it known that we, CHARLES H. WILLCOX, of New York city, in the county and State of New York, and STOCKTON BORTON, of Providence, in the county of Providence and State of Rhode Island, have invented new and useful Improvements in Sewing-Machines, which are fully set forth in the following specification.

The present invention embraces certain improvements in sewing-machines, which improvements have particular reference to and are shown in the drawings as embodied in a machine designed to unite two pieces of fabric (and especially knit goods) at their edges by an overseam.

The general form and organization of the machine and many of the parts or elements thereof are similar to that described in an application for patent filed by us July 23, 1887, Serial No. 245,079, to which reference is made for the purpose of a clearer explanation of the improvements constituting the present invention. By our former machine an overedge seam was formed of a single thread through the co-operation, with an eye-pointed needle, of a looper having two jaws. This looper seized a loop of thread beneath the cloth, carried it around and over the cloth, and held it in the path of the descending needle until caught thereby, when the looper dropped the loop and returned to the under side of the cloth in time to catch the succeeding loop upon the ascent of the needle.

One object of the present invention is the formation of an overseam of two threads whose successive loops interlock, and which we denominate an "overlock-seam." In the looper as modified to effectuate this object the lower jaw becomes a needle for the lower thread. This change in the operation of the machine necessitated or rendered expedient further modification in different parts of the mechanism.

The following are the principal new features of the invention, in addition to the new form of looper referred to above:

First. In order to exert proper control over the two threads it has been found necessary to introduce two take-up mechanisms operating in connection with the needle and looper, respectively; and the invention embraces the combinations of these elements, as well as the particular construction and arrangement of the take-up mechanisms, which, with their purpose and action, will be hereinafter fully described.

Second. In sewing fabric and particularly in sewing knit goods the effect of the action of the needle and feed is to stretch the fabric at the edge, and in an overedge-stitch there is nothing to counteract this tendency to elongate the fabric at the sewed edge. For this purpose we have introduced a gathering or differentially-acting feed—that is to say, a feed by which the work is pushed or crowded toward the needle somewhat faster than it is moved away from the needle in the rear thereof. The result is the production of a seam which is at least no longer, and practically may with advantage be made a little shorter, than the body of the goods. This part of the invention includes, while not limited thereto, the particular construction of the feed-action which we prefer to employ and which will be hereinafter described.

Third. In the former machine provision was made for the simultaneous adjustment in a direction at right angles to the seam of the presser-foot and shearing mechanism, the object being to provide an initial adjustment of the width of trimming suitable for the particular work in hand, which adjustment was not designed to be disturbed during the progress of the work; but on further experience with this type of machine we have found it necessary, or at least expedient, to provide means for increasing the width of trimming at certain portions of the work where a stronger seam than ordinarily needed is required to guard against the danger of raveling. This necessity presents itself, for example, in sewing under the armholes of shirts or in places where the fabric is cut across or more or less obliquely to its wales. Means for effecting this adjustment while the work is in progress and without interrupting the operation of the machine constitute a feature of the invention, as do, also, the particular means hereinafter described for that purpose, and the modifications of other parts made to accommodate the same to this new action—as, for instance, the provision whereby the lower shear-blade is permitted to follow automatically the motions of the presser-foot and upper blade.

Fourth. In the use of this machine it is found advantageous to employ for the under thread a soft single yarn similar to the yarn of which the fabric is knitted, and which in passing through a tension apparatus sheds a great deal of lint, which would soon clog an ordinary friction-tension, holding the friction-surfaces apart and impairing their action. To overcome this difficulty, we have devised a special form of tension device partaking of the nature of both the wheel and friction varieties and comprising a revolving part or washer around which the thread is wound and another washer or disk held in contact with the first by a spring whose pressure imparts the requisite tension to the thread. A space is left between the barrel of the revolving washer and the co-operating friction-washer sufficiently large to permit the escape of lint. A good hard-twist thread—such as employed by us for the upper thread—does not make lint. Still small pieces of cotton or lumps on the thread frequently get caught between the tension-disks and hold them apart, so that the form of tension herein described is desirable, also, for the upper thread. This kind of thread requires considerable tension, and in order to make the washers revolve with a smooth hard thread it is preferred to add a supplemental tension or friction to produce such tight hold upon the barrel as to revolve the same. This part of the invention includes the special construction of tension apparatus hereinafter more fully described.

The invention includes the above new elements, as well as the combinations and subcombinations thereof. It also includes other improvements, all of which will now be described in connection with the accompanying drawings, which form part of this specification.

Fig. 16 is a side view of the feed-rocker and its driving-rod; Fig. 17, a side view of the feed mechanism, and Fig. 18 a top view thereof.

Figure 1:
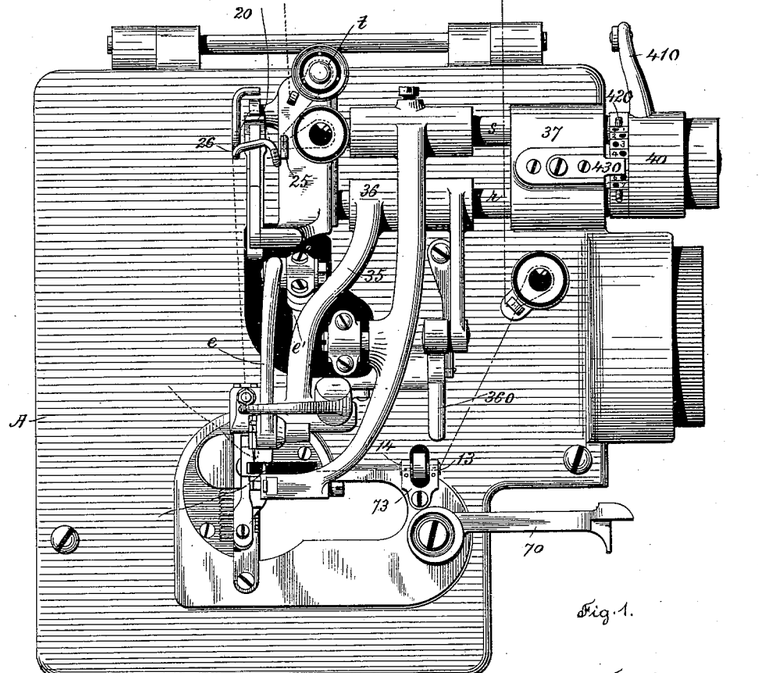
Figure 1 is a top view of the machine.
Figure 10:
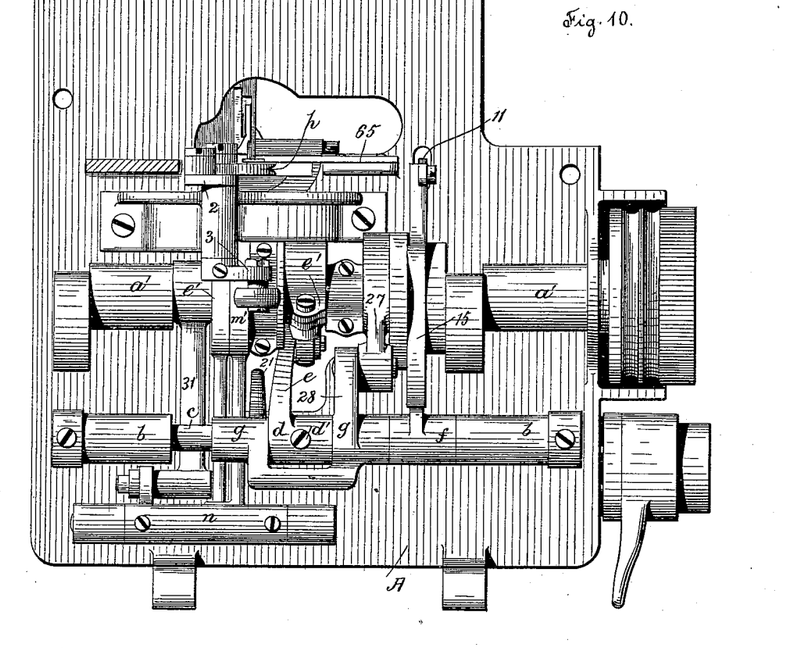
Fig. 10 is a bottom view of the machine.
Figures 13, 14, 15:
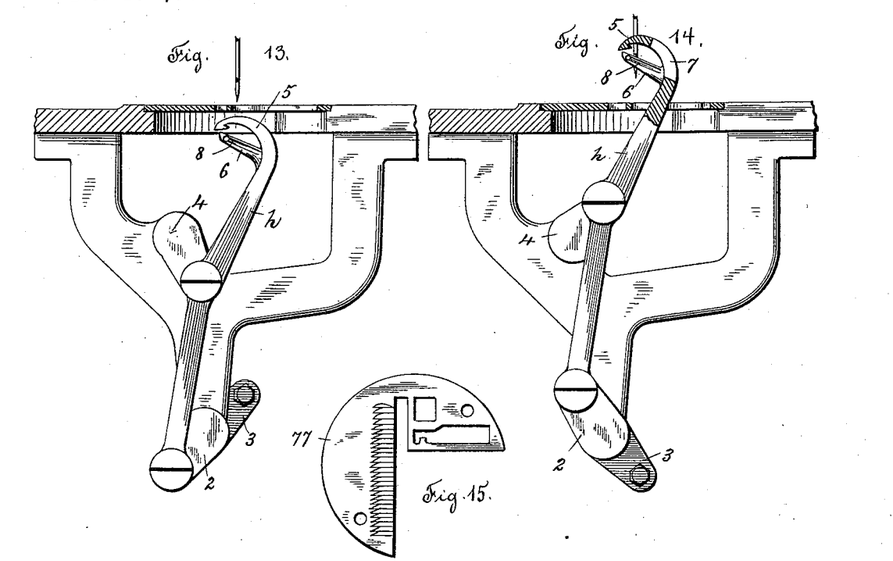
Figs. 13 and 14 are sections through the throat-plate, showing the looper in elevation in two positions.
Fig. 15 is a detail view of the work-plate.
Figure 23:
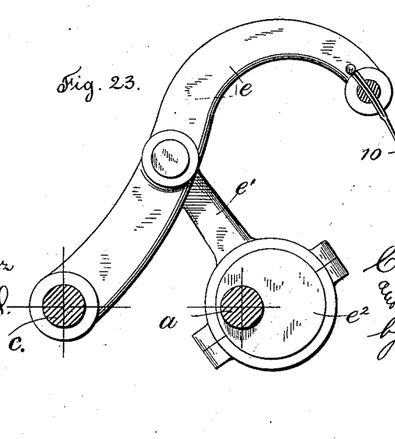
Fig. 23 is a side view of the needle-arm.
Figure 24:
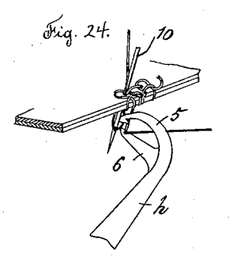
Figs. 24 to 29, inclusive, are details in perspective illustrating the different steps in formation of a stitch.
Figures 27, 28, 29, 30:
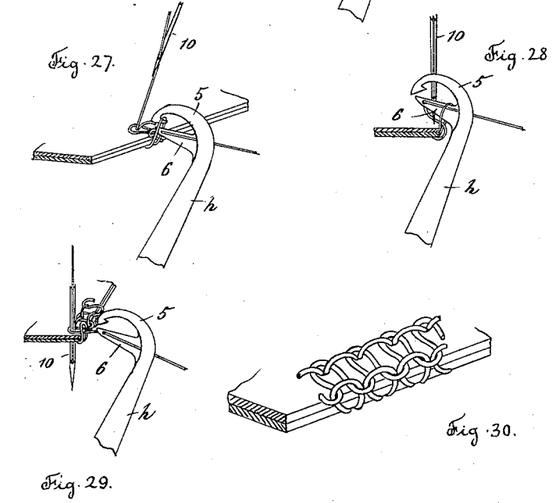
Fig. 30 is a detail view showing part of a finished seam.

The parts are assembled in what is known as a "box-machine," in which the bed-plate A constitutes the hinged cover of a box and supports all the moving parts of the machine. On the under side of the cover A and extending across the same is the main shaft $a$ in bearings $a'$, which carries a number of eccentrics and cams for operating the several parts. Supported in bearings $b$ behind shaft $a$ and parallel therewith is the rock-shaft $c$, to which the sleeve $d$ at the lower end of the needle-bar $e$ is secured by a screw $d'$. It also serves as center of oscillation for the sleeve $f$ of the lower-thread take-up and the sleeve $g$ of the upper-thread take-up. The needle-arm $e$, Figs. 1, 10, and 23, is reciprocated through a rod $e'$ from eccentric $e^2$ on shaft $a$. The looper $h$, Figs. 10, 13, and 14, which operates in conjunction with the needle in forming the stitch, is supported and actuated, as described in our former application. It is pivoted at its lower extremity to the crank-arm 2 of a rock-shaft, which at its other end has a crank-arm 3, by which it is driven from an eccentric on the shaft $a$. Near the middle of its shank the looper $h$ is pivoted to a crank-arm, which swings through an arc whose extreme limits are indicated in Figs. 13 and 14. By reason of the control of arm 4 when arm 2 raises the looper $h$ its operating end instead of rising vertically describes a curve around the throat-plate and the edge of the fabric thereon, the upper and lower extremes of this curve being in substantially the same vertical plane. As in the former machine the needle moves in a plane that intersects the plane of motion of the looper at an oblique angle, so that the looper passes behind the needle when both are beneath the cloth, as shown in Fig. 24, and in front of the needle when both are above the cloth, as shown in Fig. 28. The looper is, as heretofore, bifurcated at its operating end and the upper member 5 is a barbed or hooked jaw. The lower member 6 is pointed and has an eye near the point, constituting a needle for the lower thread which passes to the eye through a slot 7, Fig. 14, in the upper member or jaw. The front face of the needle shank is provided with a thread-groove 8.

Figure 25:
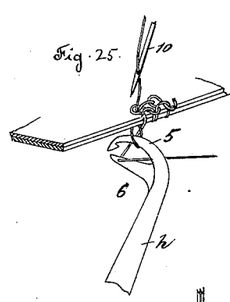
Figure 26:
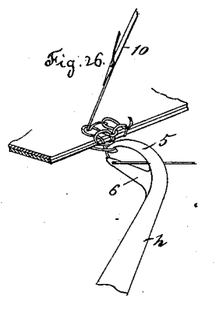

In operation (see Figs. 24 to 29) the needle 10, having carried the upper thread through the fabric, casts a loop of the thread as it begins to rise. At this point the upper jaw of the looper begins to enter this loop, Fig. 24, behind the needle and continues its movement to the left as the needle rises until its barb or hook is well beyond the loop, which is drawn close around the shank of the jaw, Fig. 25. The looper then begins its movement to the right and upward, the loop being caught by the hook and carried around the edges of the fabric, Figs. 26 and 27, and at the same time spread so that when it falls from the hook it is caught by the shank of the looper-needle, Fig. 28, whose thread (the lower thread) also passes doubled through the loop. The needle is now descending, and while its previous loop is still held by the looper-needle its point passes between the rear face of the looper-needle and its thread, so that when the looper retreats and descends, Fig. 29, a loop of the under thread is caught by the needle 10. A succession of these movements produces a seam, which is clearly delineated in Fig. 30, the successive loops of the two threads being locked along a line at or near the edge of the fabric. This interlocking may take place at the edge or at a greater or less distance from the edge on the top or bottom of the work, according to the timing of the lower-thread take-up, which will be presently described.

Figures 19, 20, 21, 22:
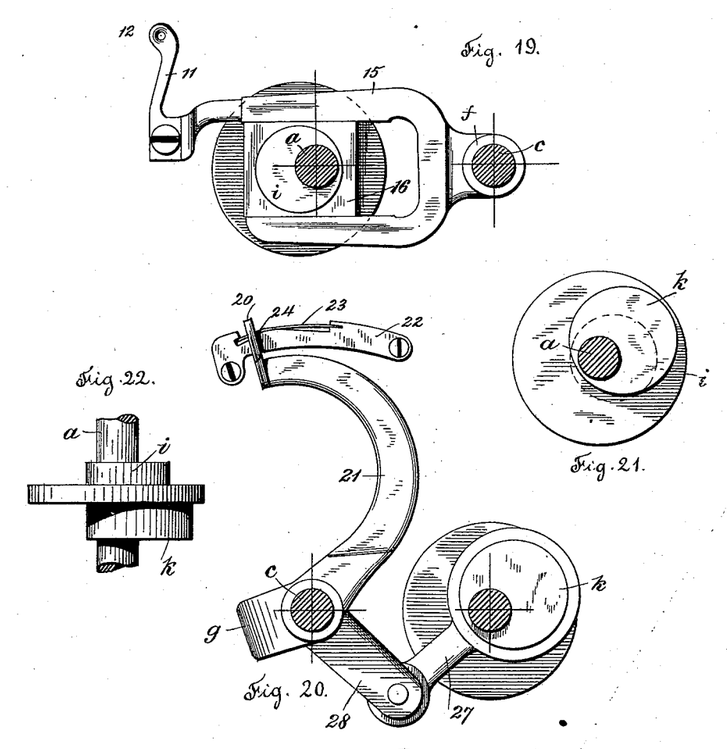
Fig. 19 is a side view illustrating the lower-thread take-up and its operating mechanism.
Fig. 20 is a similar view of the upper-thread take-up and operating mechanism.
Figs. 21 and 22 are details of the take-up eccentrics.

The proper control of the threads calls for two take-ups. The under-thread take-up, Fig. 19, is an upright finger 11, having an eye 12 in its upper end, which projects through a slot in the bed plate or cover A, Fig. 1. Adjacent to and on opposite sides of the take-up are thread-guides 13 14, the thread passing first through guide 13, then through the eye of the take-up, then through guide 14, and thence to the looper-needle. As the finger 11 moves up between the guides 13 14 it draws up the lower thread and sets the stitch. In setting the stitch at the edge, as shown in Fig. 30, the take-up begins to draw on the thread about the time the looper begins to move upward and ceases to act when the looper has completed about half of this upward movement. The take-up finger 11 is carried by a frame or arm 15, attached to or in one piece with sleeve $f$, which, as already stated, can oscillate freely about rock-shaft $c$, Fig. 19. Frame 15 is forked and its members embrace a plate 16, which can slide freely between them. The frame is oscillated by an eccentric $i$ on shaft $a$, which eccentric turns in a circular opening in plate 16. The upper-thread take-up, Figs. 1, 10, and 20, is a slotted finger 20 on the end of a reciprocating arm 21. A curved bar 22 lies in the slot of finger 20 and this bar is herein termed the "take-up post." The thread passes between this post and a spring 23, which bears lightly against the post at the point 24, Fig. 20. It is desired to give a quick action to the take-up, to effect which the arm 21 is given a long movement, only a small part of which—namely, that which takes place behind the thread-pins 25 26, Fig. 1—is effective in drawing upon the thread. Arm 21 is in one piece with a sleeve $g$, (which is in two parts, the sleeve $d$ of the needle-arm lying between them,) which can oscillate freely about rock-shaft $c$, and is actuated by an eccentric $k$ on shaft $a$, Figs. 20, 21, and 22, through a rod 27 and an arm 28, attached to or in one piece with sleeve $g$.

The object of the take-up post and spring is to hold the thread lightly at the extreme back end of the movement until the descent of the eye of the needle, there being a double incline on the upper edge of post 22, which acts as a detent. When the needle descends through the cloth, the spring yields, permitting the thread to slip past the detent, and the thread is drawn out until it brings up against the thread-pins, which are so arranged as to allow but little movement of the thread until the time when it is necessary to have the eye of the needle act upon the thread to assist in drawing up the stitch. The stitch is thus drawn up partly by the needle and partly by the take-up, which is acting on the thread while the needle is ascending. At the time when the upper thread has escaped from spring 23 and brings up against the thread-pins the lower jaw or needle of the looper is just backing out of the loop of upper thread, (see Fig. 28,) which consequently can be drawn up. This is done by the continued downward movement of the upper needle. When the eye of the needle is passing through the cloth, the thread-pins resist the drawing of thread through the tension. Consequently as the needle must have a supply of thread its continued downward movement draws up the stitch.

Figures 16, 17, 18:
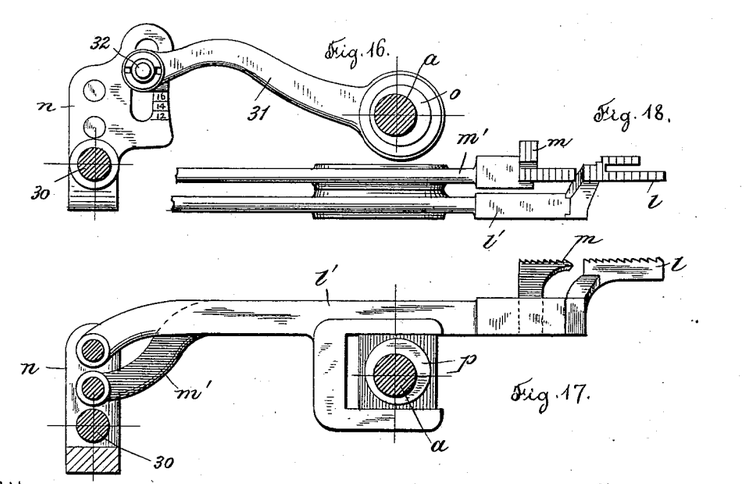

The feed of the cloth is effected by two serrated feed-surfaces $l$ and $m$, Figs. 17 and 18, carried, respectively, by the feed-bars $l'$ $m'$. Feed-surface $l$ acts upon the fabric in front of the needle and feed-surface $m$ acts behind the needle. For reasons already explained it is desired to crowd the goods toward the needle somewhat faster than it is fed away from the same, which effect is produced, as shown, by giving to the feed-bar $l'$ a somewhat longer horizontal motion than the feed-bar $m'$. Both these bars are pivoted to the feed-rocker $n$, which rocks on the center 30. Bar $l'$ is attached to the rocker at a point farther from the center 30 than the point of attachment of bar $m'$, and consequently has the longer and faster motion. Rocker $n$ is actuated by an eccentric $o$ on shaft $a$, Fig. 16, through a rod 31, which is connected with the rocker by a screw-pin 32, passing through a slot therein, so that by setting the screw to different positions in the slot the length of stitch can be varied. It will be noticed that a change in the length of feed does not affect the relation of the movements of the two feed-surfaces. The vertical movement of the feed-bars is derived from eccentric $p$ on the main shaft, as clearly shown in Fig. 17.

The improved feed mechanism, consisting of two feed-surfaces, one acting in front and the other in the rear of the needle, and the former having a more rapid motion than the latter, will be found useful in forming zigzag seams, and in some instances even in forming straight-ahead seams.

Figure 8:
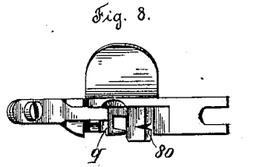
Figs. 8 and 9 are views in plan and elevation, respectively, of the presser-foot.
Figure 9:
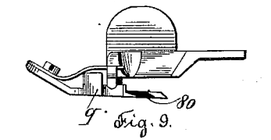

The rocking presser-foot $q$, Figs. 1, 8, and 9, is substantially like that heretofore devised by us. It is, however, provided in the rear edge of the part which bears on the cloth with a V-shaped notch 80. The object of this notch is to facilitate the breaking of the chain of stitches between two pieces of goods, which is accomplished by pulling the chain over the presser-foot. In so doing the chain is wedged into the notch 80, and the pull exerted to break it produces no strain on the needle and looper, so that the machine is ready to start up again on the next piece of work. The rocking presser-foot $q$ is carried by a presser-bar 35, which is attached to or in one piece with a sleeve 36 on shaft $r$, and may be raised by the lifting-lever 360 in the usual way. Parallel with shaft $r$ is a similar shaft $s$, and both these shafts pass through a bearing 37 and touch at their ends against a nut 40, the shafts being pressed toward this nut by springs, as heretofore. Shaft $s$ supports the arm 41 of the upper shear-blade 42, (see Figs. 11 and 12,) so that the presser-foot and upper shear-blade partake of any longitudinal motion of shafts $r$ $s$, whereby the width of trimming will be varied.

Our present object is to provide means whereby the width of trimming can be changed without interrupting the operation of the machine. To this end the screw-nut 40 is provided with an arm 410, adapted for connection with a treadle to be operated by the foot of the operator. For the purpose of limiting the motion in either direction to the point desired, a number of holes are bored in the periphery of the nut to receive stop-pins 420, which arrest the motion of the nut by contact with the overhanging projection 430.

It will be evident that to permit the making of frequent and instantaneous changes in the width of trimming the lower or stationary cutter must be free to follow the upper blade in its various positions. Consequently we omit the clamp-screw heretofore employed to clamp the lower blade-holder in position.

Figures 11, 12:
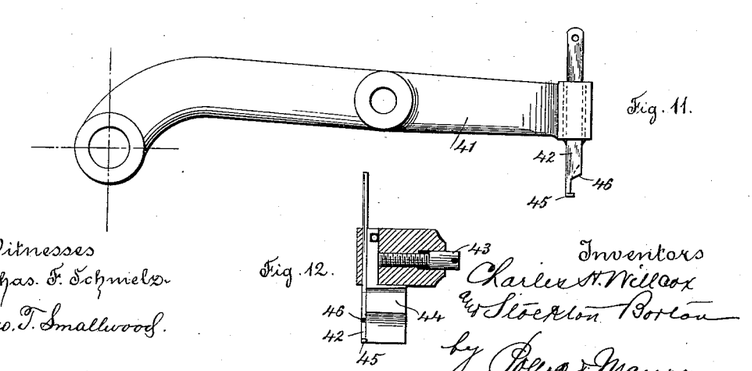
Fig. 11 is a side view of the upper shear-blade and arm.
Fig. 12 is a vertical section thereof transverse to the arm.
Figure 31:
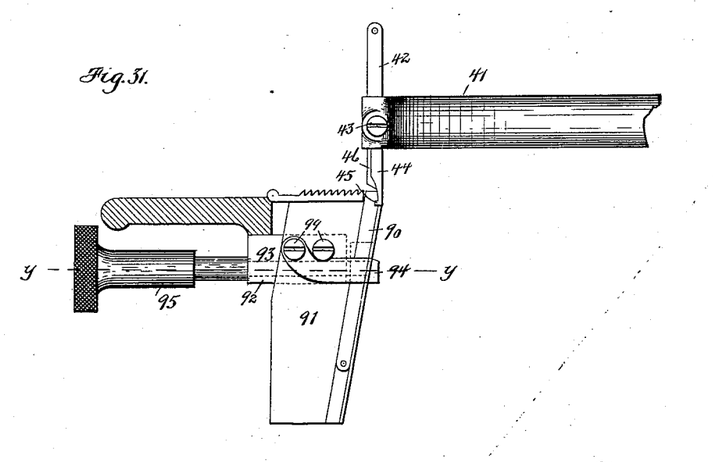
Fig. 31 is a side view of the trimming mechanism.
Figure 32:
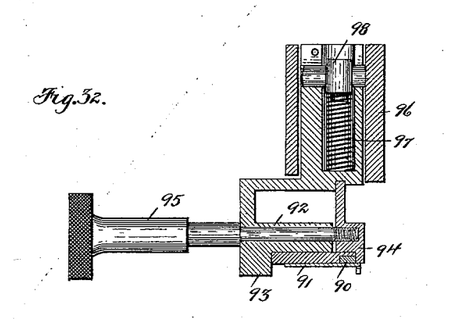
Fig. 32 is a horizontal section on line $y$, Fig. 31. The lower blade and its support are not shown in the other figures.

The upper shear-blade 42 is set and adjustable vertically in the head of arm 41, being held by a clamping-screw 43. This screw does not bear directly upon the blade; but a shoe 44, Fig. 12, is interposed. At the lower end of the shoe is a little projection or toe 45, upon which the bottom of the shear-blade 42 rests, so that the shoe constitutes a guide for setting the blade. The cutting-edge of this blade is at 46. The shoe 44 also constitutes the clearer for deflecting downward the cut-off strip. The shoe supports the upper blade to its very lowest extremity and counteracts any tendency thereof to bend away from the lower blade. The lower shear-blade 90, Figs. 31 and 32, is a blade or thin bar of steel set in an oblique groove in the stock 91 and adjustable lengthwise therein. Stock 91 is set against the end of carriage 92 and secured thereto by screws 99. The end of the carriage has projections 93 94, which embrace and clamp the edges of the stock. The projection 94 is in a piece of steel set at one end in the carriage and is somewhat springy. It can therefore be drawn toward the latter, so as to clamp the stock, by means of a screw 95 provided with a milled head. The carriage 92 can slide in a box 96, secured to the bed-plate. It is pressed toward the right—that is to say, in a direction to keep the stationary blade 90 in contact with the upper blade 42 by means of a compression-spring 97, which presses at one end against the carriage and at the other against the head of a stationary pin 98. It is evident that when the upper shear-blade is moved to the right the carriage and all parts carried thereby will follow it, keeping the upper blade in contact with the lower one, and that when the upper blade is moved to the left the lower blade and its supporting parts will be pushed in the same direction against the pressure of spring 97.

Figure 6:
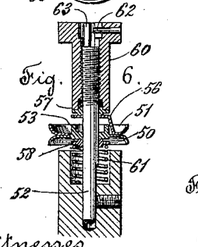
Fig. 6 is a vertical section of the tension apparatus, and Fig. 7 a top view of the upper tension-washer.
Figure 7:
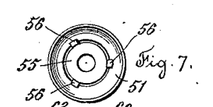

The tension apparatus is illustrated in Figs. 6 and 7. The parts which act directly on the thread are two washers 50 51, which loosely surround a pin 52, threaded at its upper end. The lower washer has a hub or barrel 53, and the thread is given a turn around this barrel. The upper washer 51 is struck up at the center, forming a hollow or depression which fits over the barrel 53 without touching the same. The raised central disk 55 of the upper washer is connected with the lower part thereof only by the narrow strips 56, between which are left spaces for the escape of lint. These strips do not touch that part of the thread which surrounds barrel 53 and lies in the triangular space between these parts, so that the tension (as far as the same is imparted to the thread by pressure of the opposing friction-surfaces) is confined in its action to a small surface, the faces of the washer being designedly made convex. As the thread is drawn by the needle it partly slips between the friction-surfaces, and also slightly revolves the washers, so that any little lint that may be left between the friction-surfaces is being constantly removed by the rotation of the washers.

Between the nut 60 and upper tension-washer is interposed the washer 57, and between the spring 61 and lower tension-washer is the washer 58, the bearing-surfaces of the washers 57 and 58 being reduced, as shown, so that the tension-washers may rotate with greater freedom. The pressure of the tension-spring 61 may be regulated by turning the nut 60 in the proper direction. To limit the adjustment, a cross-pin 62, carried by the nut 60, makes contact with a projection 63 of the screw-pin 52 and is arrested thereby.

Where a smooth hard twisted thread is used, as for the upper thread in the machine shown, it is necessary, in order that the loop of thread around the barrel 53 may take strong enough hold to turn the latter, that a supplemental tension should be employed, as shown at *t*, Fig. 1. The loosely-spun yarn which we prefer to employ for the lower thread has a rough surface, which enables it with a very light tension to turn the washers. An additional tension for the lower thread is therefore neither necessary nor desirable.

Figure 4:
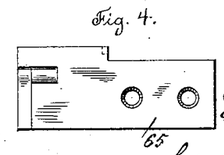
Fig. 4 is a front view, and Fig. 5 an edge view, of the needle-shield.
Figure 5:
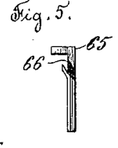

The needle-shield 65, Figs. 4, 5, and 10, is employed for the purpose of insuring the proper position of the needle. It consists of a plate bolted to the bed at the rear edge of the opening through which the trimmed-off strip is removed. At its left-hand edge is a slot 66, oblique to the plane of the bed-plate, through which slot the needle passes. This shield is designed to prevent the needle ever getting so far into the path of the hook of the looper as to be caught by it or so far away from it as not to catch the loop.

Figure 2:
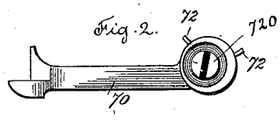
Figs. 2 and 3 are detail views of a cuff-guide.
Figure 3:
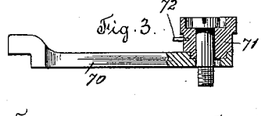

The cuff-guide 70 (shown in Figs. 1, 2, and 3) is similar in general form to that heretofore used. Heretofore, however, this guide has had no adjustability. As shown in the drawings, it turns on an eccentric, which is attached to the bed-plate A by a screw-stud 720, which passes through a slot in the guide 70. This construction furnishes all the necessary adjustments of the cuff-guide toward and away from the line of seam. We prefer to provide the face of eccentric 71 with a series of holes for placing the stop-pins 72, which limit the motion of the eccentric in either direction by contact with the part 73, so that the desired change from one extreme to the other can be quickly and readily made. This construction or some equivalent thereof we find desirable for the reason that some motion is required to change quickly from thin to thick work when a different depth of the hold of the stitch in the cuff becomes necessary.

The form of throat-plate 77 is clearly shown in Fig. 15 and needs no description.

We have described and illustrated what is regarded as the best embodiment of our invention. It will be understood, however, that modifications may be made in some of the parts or combinations of parts and that some of said parts or combinations may be used without others without in either case departing from the spirit of the invention.

Having now fully described our said invention, what we claim, and desire to secure by Letters Patent, is—

1. The combination, with the cloth-plate, needle, and actuating mechanism, of a looper reciprocating around the edge of the cloth-plate and provided with an upper hooked jaw and a lower eye-pointed jaw and means for reciprocating said looper, substantially as described.

2. The looper made with two jaws, one of which is furnished with a hook and the other with an eye, in combination with a reciprocating needle and operating mechanism for moving the looper in a plane oblique to the plane of movement of said needle, substantially as described.

3. The combination, with the needle for the upper thread, the take-up therefor, and the looper having a hooked upper jaw and a lower pointed jaw furnished with an eye for a lower thread, said parts co-operating to form an overlock-stitch, of a second take-up for drawing up the lower thread and setting the stitch, substantially as described.

4. The combination, with the stitch-forming mechanism, of take-up mechanism comprising an oscillating take-up arm, means for moving the same independently of the needle, and stationary thread-pins on opposite sides of the path of movement of said arm and intermediate between the ends of said path, which pins catch the thread when the needle enters the cloth, so that the needle completes the drawing up of the stitch, substantially as described.

5. The combination of the reciprocating needle, the reciprocating take-up movable independently thereof and consisting of an arm slotted at its outer end, a take-up post embraced by the slot in said arm, and thread-pins on opposite sides of said post and near the end of the path of movement of said arm, substantially as described.

6. The combination of the needle, the reciprocating take-up, actuating mechanism moving the latter away from the needle as it descends, thread pins or guides for holding the thread, said pins or guides being placed near the end of the take-up's movement, and a take-up post provided with a detent in the rear of said thread-pins, substantially as described.

7. The combination of the reciprocating needle, the co-operating looper having an eye-pointed member and operating in conjunction with said needle to make an overedge lock-stitch, a take-up for the looper-thread, and a take-up for the needle-thread, the latter take-up comprising an arm oscillating independently of the needle, and thread-pins on opposite sides of the arm and intermediate between the ends of its path of movement, so that the arm draws on the thread during the latter portion only of its backward movement, substantially as described.

8. The combination, with devices for forming overedge-stitches, of the two feed-bars with their feed-surfaces, one of which acts in front of the needle and the other in rear thereof, and actuating mechanism for moving the former more rapidly than the latter, substantially as described.

9. The combination of the feed-rocker and the two feed-bars respectively attached to said feed-rocker at different distances from the center of oscillation thereof, substantially as described.

10. The combination of the feed-rocker and means for adjusting the same to oscillate through a longer or shorter arc, and the two feed-bars respectively connected with said feed-rocker at different distances from its center of oscillation, substantially as described.

11. In combination with the stitch-forming devices, the upper and lower shear-blades and their supports, said supports being free to move toward and away from the needle while the machine is in operation, and means—such as specified—for adjusting both blades with their supports while the sewing proceeds, substantially as described.

12. The combination of the presser-foot adjustable with reference to the needle, the shearing mechanism also adjustable with reference to the needle, and the adjusting-nut controlling the positions of both said parts, said nut having an operating-arm adapted for connection with a treadle, whereby said parts can be adjusted simultaneously while the machine is in operation, substantially as described.

13. The combination of the shearing mechanism, the presser-foot, laterally-adjustable supports for the presser-foot and shear-blades, the adjusting-nut, and its stop-pins for determining the limits of variation, the said nut being arranged to adjust the position of said supports, substantially as described.

14. The combination, with the movable shear-blade and its support, of a shoe interposed between the two and supporting the blade both beneath and above its cutting-edge, substantially as described.

15. In combination with the shear-blade, the shoe having a toe or projection against which the end of the blade is set, substantially as described.

16. In combination with the blade, the shoe movable within said blade and having a deflecting-face extending away from the plane of movement of the blade, so as to deflect the cut-off strip, substantially as described.

17. The combination, with the reciprocating needle and looper, of the stationary needle-shield consisting of a plate or piece attached to the bed of the machine beneath the cloth-plate and having a slot in the path of the needle and controlling the position thereof with respect to the looper, substantially as described.

18. The cuff-guide hinged on an adjusting-eccentric, so that it can be swung on said eccentric into and out of position and adjusted with reference to the line of seam by turning said eccentric, substantially as described.

19. A sewing-machine presser-foot provided with a notch in the rear edge of the surface which bears upon the work, said notch being in the line in which the stitches are formed and constituting a thread-cutter, substantially as described.

In testimony whereof we have signed this specification in the presence of two subscribing witnesses.

CHAS. H. WILLCOX.
STOCKTON BORTON.

Witnesses:
CHARLES E. HAVENS,
JOSEPH B. CURTIS.